United States Patent [19]

Tomisawa

[11] Patent Number: 5,701,868
[45] Date of Patent: Dec. 30, 1997

[54] METHOD AND APPARATUS FOR CONTROLLING THE IGNITION TIMING OF AN INTERNAL COMBUSTION ENGINE

[75] Inventor: Naoki Tomisawa, Kanagawa-ken, Japan

[73] Assignee: Unisia Jecs Corporation, Kanagawa-ken, Japan

[21] Appl. No.: 783,291

[22] Filed: Jan. 10, 1997

Related U.S. Application Data

[63] Continuation of Ser. No. 544,352, Oct. 17, 1995, abandoned.

[30] Foreign Application Priority Data

Oct. 20, 1994 [JP] Japan ................................. 6-255097

[51] Int. Cl.$^6$ .............................................. F02P 5/15
[52] U.S. Cl. .................................... 123/424; 60/284
[58] Field of Search ............................ 123/424, 425; 60/284

[56] References Cited

U.S. PATENT DOCUMENTS

| | | | |
|---|---|---|---|
| 4,111,010 | 9/1978 | Minami | 60/284 |
| 4,920,494 | 4/1990 | Abo et al. | 123/425 |
| 5,345,908 | 9/1994 | Nishimura et al. | 123/424 |

FOREIGN PATENT DOCUMENTS

| | | | |
|---|---|---|---|
| 3-117650 | 5/1991 | Japan | 123/424 |

OTHER PUBLICATIONS

JAPIO, Patent Abstracts of Japan (CD–ROM), vol. 94, No. 10, JP 6–288289 (Kenichi), Oct. 11, 1994.

*Primary Examiner*—Andrew M. Dolinar
*Attorney, Agent, or Firm*—Lowe, Price, LeBlanc & Becker

[57] ABSTRACT

The heavy/light grade of fuel supplied to an internal combustion engine is detected, for example with a sensor or by detecting fluctuations in combustion pressure, and a retard angle correction amount for control of an ignition timing retard angle for activating an exhaust gas purification catalytic converter during a predetermined interval after engine start-up, is set based on the detected properties of the fuel. The time required for activating the exhaust gas purification catalytic converter can thus be shortened by retarding the ignition timing, corresponding to the heavy/light grade of the fuel, to increase the exhaust temperature while maintaining combustion stability.

6 Claims, 4 Drawing Sheets

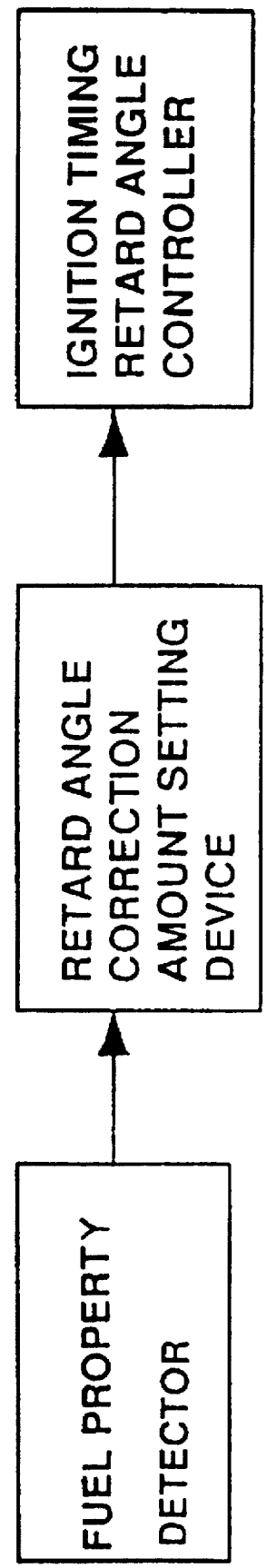
F I G. 1

METHOD AND APPARATUS FOR CONTROLLING THE IGNITION TIMING OF AN INTERNAL COMBUSTION ENGINE

This application is a continuation of application Ser. No. 08/544,352 filed Oct. 17, 1995, now abandoned.

BACKGROUND OF THE INVENTION

1. Field of the Invention

The present invention relates to technology for maintaining the stability of an internal combustion engine while promoting activation of an exhaust gas purification catalytic converter.

2. Description of the Related Art

To improve exhaust gas purification performance of an internal combustion engine, the catalytic converter should be activated as soon as possible after starting of the engine. The ignition timing is therefore retarded after starting to discharge unburned fuel vapour which generates re-combustion heating in the exhaust passage, thus quickly activating the catalytic converter with the heat of reaction.

If the amount of correction of the ignition timing retard angle is too large however, combustion becomes unstable, resulting in surge and fluctuations in rotational speed, and consequent deterioration in drivability. There is thus a limitation to the amount of correction of the retard angle.

Immediately after starting (in the low water temperature region) where quick activation of the catalytic converter is desired, the maximum retard angle correction amount for where combustion becomes unstable, is strongly influenced by the fuel properties (heavy/light grade), differing by approximately 5–10 degrees, maximum retard angle correction amount for heavy grade fuels being small, and that for light grade fuels being large.

Heretofore, the fuel has been assumed to be heavy grade, and the maximum retard angle correction amount kept small. Therefore, in the case of light grade fuels, a full retard angle correction amount is not applied, in spite of the possibility of an increase therein, so that early stage activation of the catalytic converter is not fully promoted.

SUMMARY OF THE INVENTION

In view of the above problems with the conventional arrangement, it is an object of the present invention to be able to promote early stage activation of an exhaust gas purification catalytic converter to the fullest extent possible, by controlling ignition timing to a retard angle correction amount which corresponds to the fuel properties.

Moreover it is an object of the present invention to improve exhaust gas purification performance of an internal combustion engine, by early stage activation of the catalytic converter.

It is a further object of the present invention to carry this out simply and at low cost by ignition timing control.

Furthermore it is an object of the present invention to carry out fuel property detection to high accuracy.

It is a further object of the present invention to carry out fuel property detection at low cost.

Accordingly, the present invention involves; detecting (by means of a fuel properties detection device) the properties of fuel supplied to an internal combustion engine incorporating an exhaust gas purification catalytic converter in an exhaust passage, and controlling an ignition timing retard angle (by means of an ignition timing retard angle control device) during a predetermined interval after engine start-up, using a retard angle correction amount set (by means of a retard angle correction amount setting device) to correspond to the detected properties of the fuel. In this way, the following functions and effects can be obtained.

During the predetermined interval after start-up, the ignition timing retard angle is corrected so that the discharge amount of unburned gases increases, generating re-combustion heating in the exhaust passage, to thus quickly activate the catalytic converter with the heat of reaction.

If the retard angle correction amount is too large combustion becomes unstable. Moreover, the maximum retard angle correction amounts at which combustion becomes unstable, particularly in the low temperature region at start-up where it is desired to activate the catalytic converter, is strongly influenced by the properties of the fuel. The retard angle correction amount setting device however, sets the retard angle correction amount to correspond to the fuel properties detected by the fuel properties detection device, thus enabling the time required for activation of the catalytic converter to be kept as short as possible.

More specifically, with the ignition timing control, the retard angle correction amount is set smaller the heavier the properties of the fuel, and is set larger the lighter the properties of the fuel. The time required for activation of the catalytic converter, within the range for stable combustion, can thus be kept as short as possible.

The fuel properties detection may involve direct detection, for example with a sensor installed in the fuel line, so that the fuel properties can be detected to high accuracy.

Moreover, the fuel properties detection may involve indirect detection based on fluctuations in engine combustion pressure, thus enabling low cost detection.

BRIEF DESCRIPTION OF THE DRAWINGS

FIG. 1 is a block diagram showing the configuration and functions of principal elements of the present invention;

DESCRIPTION OF THE PREFERRED EMBODIMENTS

Preferred embodiments of the present invention will now be described with reference to the drawings.

Figure 2:
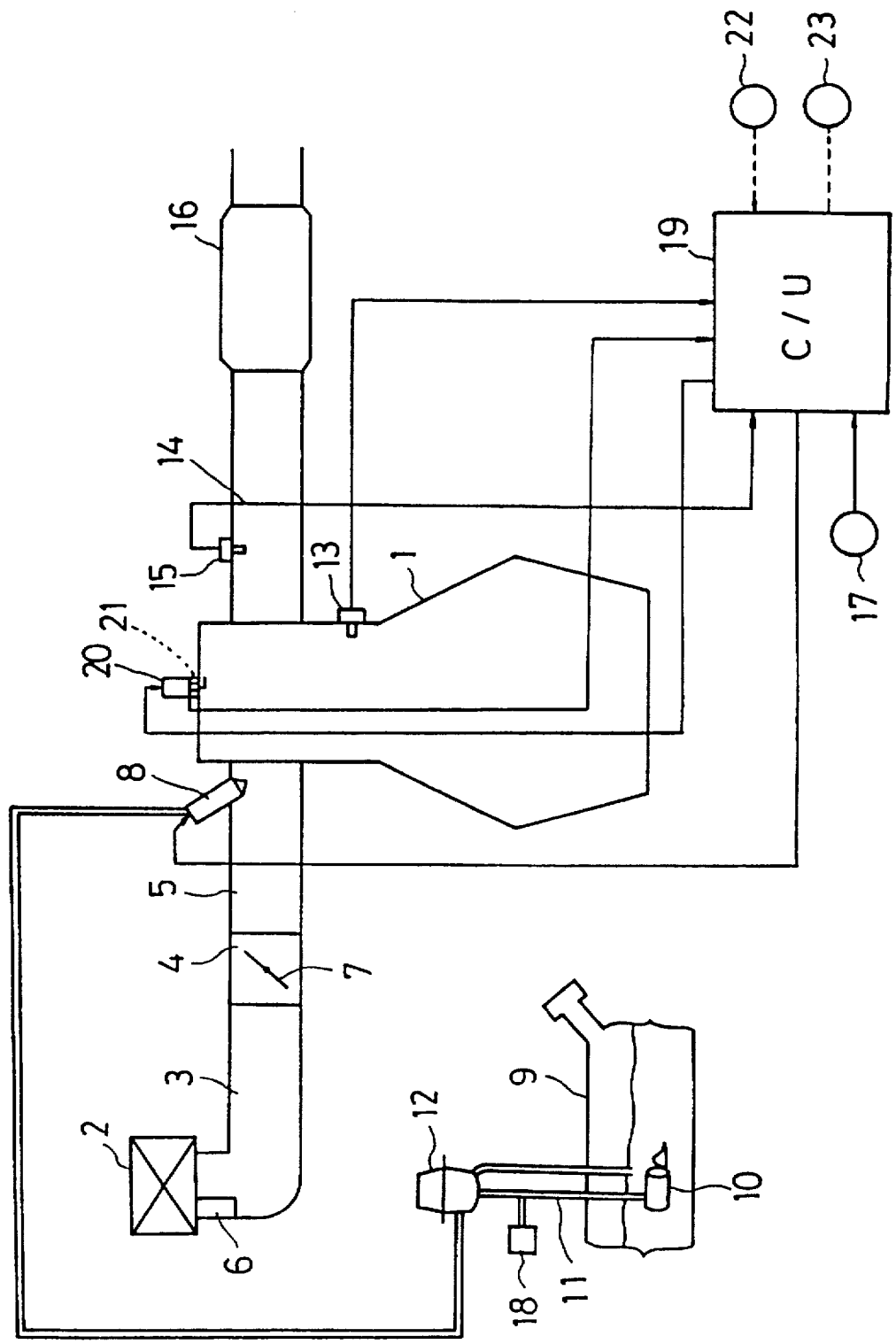
FIG. 2 is a schematic diagram showing a system configuration according to a preferred embodiment of the present invention.

Referring to the system configuration of the embodiment shown in FIG. 2, an internal combustion engine 1 draws in air from an air cleaner 2 by way of an intake duct 3, a throttle chamber 4, and an intake manifold 5.

An air flow meter 6 is provided in the intake duct 3, for detecting an intake air quantity Q. A throttle valve 7, connected to an accelerator pedal (not shown), is provided in the throttle chamber 4 to control the intake air quantity Q.

Solenoid type fuel injection valves 8 are provided in the intake manifold 5 for each cylinder, for injecting fuel, which is fed from a fuel pump 10 inside a fuel tank 9 by way of a fuel line 11, and controlled to a predetermined pressure by means of a pressure regulator 12.

A water temperature sensor 13 for detecting the cooling water temperature, is provided in the body of the engine 1, while an air-fuel ratio sensor 15 for air-fuel ratio feedback control, which detects air-fuel ratio based on oxygen concentration in the exhaust gas, is provided in the exhaust passage 14 of the engine 1 as well as an exhaust gas purification catalytic converter 16 (three way catalytic converter).

Also provided is a crank angle sensor 17 which outputs for the respective cylinders of the engine 1, a reference crank angle signal REF for each crank angle phase difference (for example 180° with a four cylinder engine), and a unit crank angle signal POS for each unit crank angle (for example 1°). A heavy/light grade sensor 18 is provided in the fuel line 11 as a fuel properties detection device for detecting the heavy/light grade of the fuel. Detection signals from these respective sensors are output to a control unit 19 incorporating a microcomputer. Based on the detection signals, the control unit 19 controls the fuel injection quantity from the fuel injection valves 8 of the respective cylinders, and the ignition timing of ignition plugs 20.

A retard angle of the ignition timing is controlled, during a predetermined interval after engine start-up, by setting a retard angle correction amount to correspond to the heavy/light grade of the fuel detected by the heavy/light grade sensor 18. The retard angle correction amount setting device (at the time of engine start-up) is provided by the functions of software stored in the control unit 19.

As noted earlier, during this predetermined interval after start-up, the ignition timing retard angle is corrected in such a manner that there is an increase in the unburned hydrocarbon gases, contained in the exhaust gas. This causes re-combustion of the unburned gases in the exhaust passage and the result is that the heat of reaction released thereby heats up the catalytic converter and accelerates its activity. The control is exercised to retard the ignition enough to ensure this.

Figure 3:
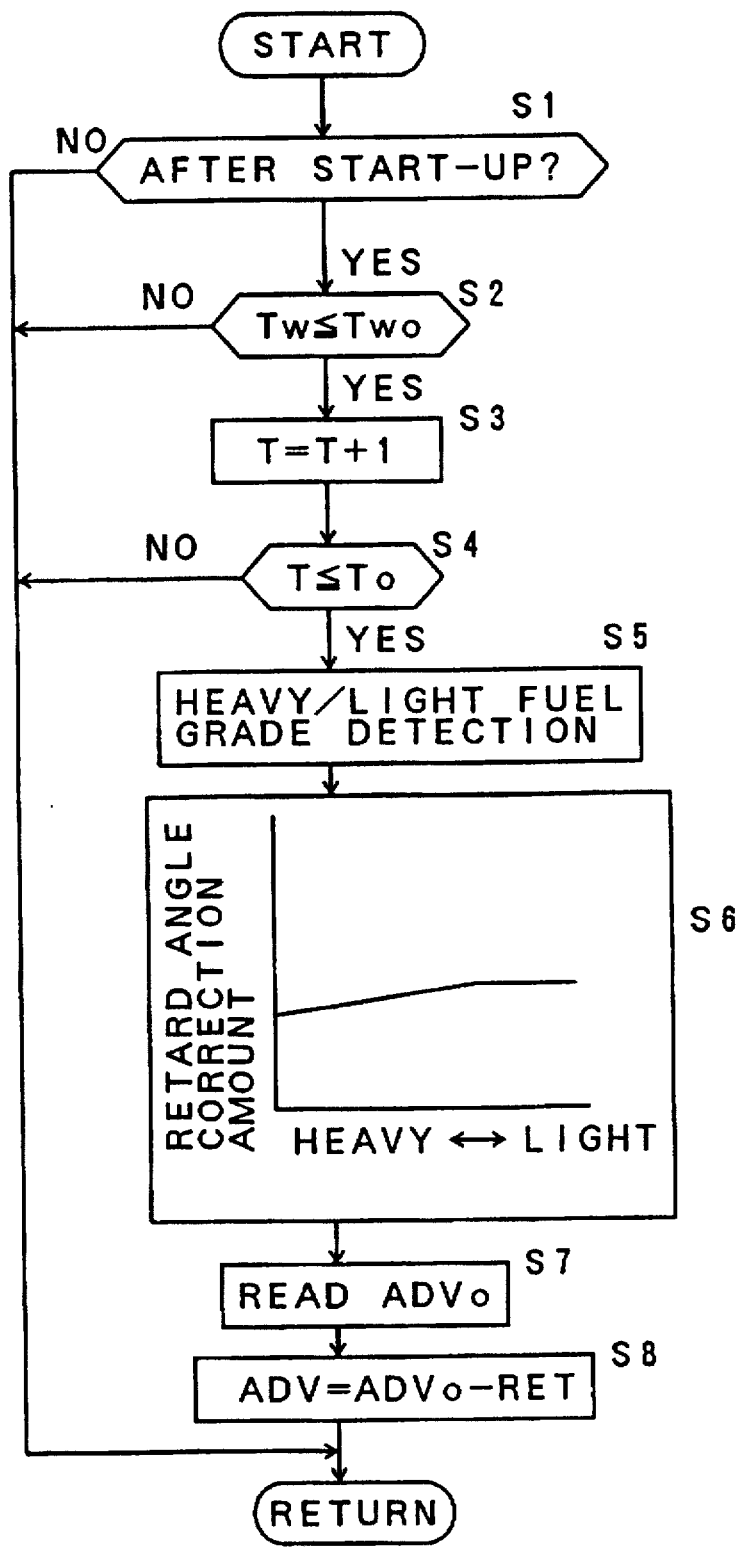
FIG. 3 is a flow chart illustrating a start-up ignition timing control routine of the embodiment.

FIG. 3 illustrates an embodiment of an ignition timing retard angle control routine which is executed at the time of engine start-up.

In step 1 (with step denoted by S in the figures), it is judged if the engine has just been started.

If so, control proceeds to step 2 where it is judged if the engine cooling water temperature Tw is within a low temperature region equal to or less than a predetermined temperature Two.

If so, control proceeds to step 3 where a timer for measuring an elapsed time from start-up is incremented.

Then in step 4, it is judged if the elapsed time from start-up T, obtained from the timer measured value, is within a predetermined time To.

If so, control proceeds to step 5 where the heavy/light grade of the fuel is detected based on the signal from the heavy/light grade sensor 18.

Then in step 6, an ignition timing retard angle correction amount RET is retrieved from map data previously stored in a ROM, in accordance with the detected heavy/light grade of the fuel. Here the retard angle correction amount RET is set as the maximum retard angle correction amount corresponding to the heavy/light grade of the fuel (volatility), which can maintain stable combustion.

In step 7, a basic ignition timing ADVo computed from the engine rotational speed N, and the engine load (basic fuel injection amount Tp and the like), is read.

In step 8, the retard angle correction amount RET retrieved in step 6 is subtracted from the basic ignition timing ADVo, and the result set as an ignition timing ADV (advance angle value).

In this way, during the predetermined time To after start-up, the ignition timing is controlled to an ignition timing ADV which has been retard angle corrected by the retard angle correction amount RET set corresponding to the heavy/light grade of the fuel. The exhaust temperature can thus be increased to the maximum limit while maintaining stable combustion, enabling the time required for activation of the exhaust gas purification catalytic converter 16 to be kept as short as possible.

The present embodiment illustrates a construction wherein the fuel properties are directly detected by a heavy/light grade sensor installed in the fuel line. With this construction, the heavy/light grade sensor can accurately detect the heavy/light grade of the fuel. However a construction is also possible wherein the fuel properties are indirectly detected based on fluctuations in engine combustion pressure. With the present embodiment, combustion pressure sensors 21, as indicated by the dotted line in FIG. 2, secured for example together with the ignition plug 19 of each cylinder, are provided as combustion pressure detection devices for detecting the combustion pressure (cylinder pressure) of the cylinders, and signals from sensors such as a throttle sensor 22 for detecting the opening of the throttle valve 7, and a vehicle speed sensor 23, are used to detect the fuel properties.

Figure 4:
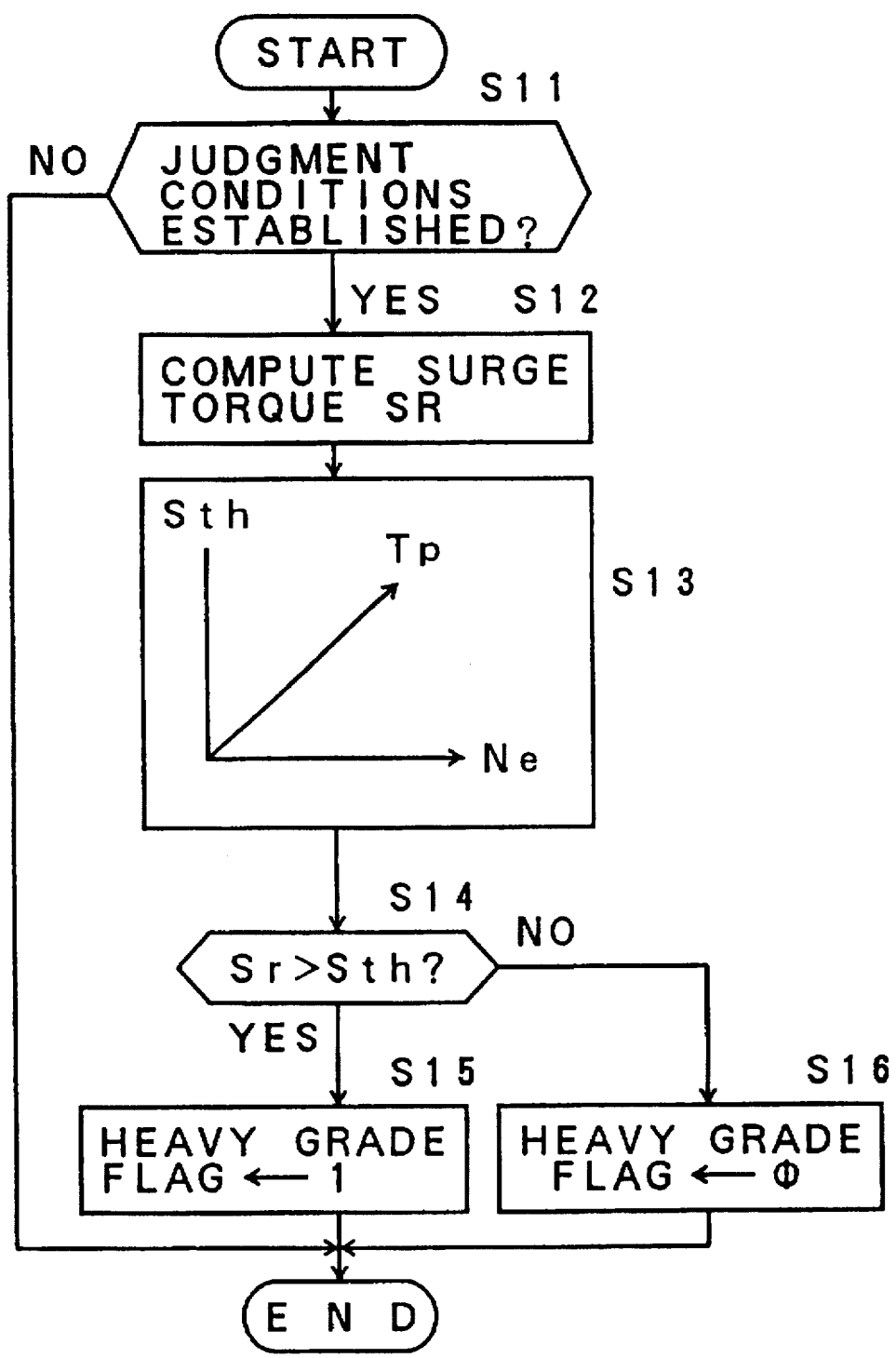
FIG. 4 is a flow chart illustrating a routine for detecting fuel properties based on fluctuations in combustion pressure.

FIG. 4 is a flow chart illustrating a routine for detecting fuel properties based on fluctuations in combustion pressure.

In step 11, it is judged if conditions for carrying out heavy/light grade fuel judgement have been established.

Basically, for judging the heavy/light grade of the fuel, the preferable condition is, steady operating conditions of the engine 1 with the vehicle speed equal to or above a predetermined value (for example 40 km/h) and the cooling water temperature Tw equal to or above a predetermined value (for example 70° C.). If cooling water temperature condition is not specified, then accuracy in judging the heavy/light grade of the fuel is deteriorated as a result of the influence from changes in fuel volatility due to differences in engine temperature. Moreover, under transitional engine operating conditions, errors can occur in the detection of surge torque (to be described later), so that fuel judgment accuracy deteriorates. Setting vehicle speed conditions, enables fuel judgement to be carried out at stable engine operating conditions.

Steady operating conditions of the engine can be detected by detecting whether or not the throttle valve opening TVO detected by the throttle sensor is constant.

When judged in step 11 that the judgment conditions have been established, control proceeds to step 12 where the surge torque Sr is computed based on the combustion pressure detected by the combustion pressure sensors 21.

The surge torque Sr can be obtained by integrating the combustion pressure detected by the respective combustion pressure sensors 21 over a constant integral range (for example 50° BTDC–50° ATDC) for each combustion cycle of the respective cylinders, then extracting the specific frequency component (equal to or less than 10 Hz) from the fluctuation frequency components of the integral values, and obtaining as the strength (amplitude) of the extracted frequency component.

The construction may be such that the surge torque Sr is computed using the combustion pressure integral values for each of the respective cylinders, or computed from the combustion pressure integral value for one specific cylinder.

In the next step 13, a map of previously stored reference surge torques Sth corresponding to the basic fuel injection quantity Tp and engine rotational speeds N, is referred to and a reference surge torque Sth corresponding to the current engine operating conditions set. In this way, the reference surge torque Sth can be set to correspond to changes in surge torque due to different engine operating conditions.

In step 14, the surge torque Sr computed in step 12 is compared with the reference surge torque Sth set in step 13 based on the engine operating conditions.

When the current surge torque Sr is greater than the reference surge torque Sth, the current fuel being used is judged to be a heavy grade fuel with comparatively poor volatility. Control therefore proceeds to step 15 where 1 is set to a heavy grade flag, indicating that a heavy grade fuel is being used. On the other hand, when in step 14 the current surge torque Sr is judged to be equal to or less than the reference surge torque Sth, then the current fuel being used is judged to be a light grade fuel with comparatively good volatility. Control therefore proceeds to step 16 where the heavy grade flag is reset to zero.

More specifically, when the fuel volatility is poor, good fuel atomization cannot be achieved, so that combustion stability is reduced and surge torque increases. Therefore, if a surge torque corresponding to reference fuel volatility is obtained beforehand as the reference surge torque Sth, then when the actually produced surge torque Sr is greater than the reference surge torque Sth, the volatility of the fuel being used will be less than the reference volatility, while when the current surge torque Sr is less than the reference surge torque Sth, then the volatility of the fuel being used will be more than the reference volatility. Hence, by comparing the surge torque Sr with the reference surge torque Sth, the volatility of the fuel can be discriminated into the two classes of fuel, namely heavy grade and light grade.

With the construction of the present embodiment wherein the heavy/light grade of the fuel is detected using combustion pressure sensors, the heavy/light grade of the fuel can be judged using detection results from combustion pressure sensors provided for misfire detection and the like, without the need to provide a special sensor for detecting the heavy/light grade of the fuel.

When as described above the properties of the fuel are discriminated into two classes, namely heavy grade and light grade, then the retard angle correction amount at the time of start-up is set to two levels; namely small for when judged that the fuel is a heavy grade, and large for when judged that the fuel is a light grade. However, the construction may be such that the fuel property judgement is carried out when the operating conditions are the more precisely set predetermined engine rotational speed N and engine load (basic fuel injection quantity Tp and the like), and the heavy/light grade level of the fuel is continuously detected, corresponding to the size of the surge torque at the time, in the same manner as for the first embodiment using the heavy/light grade sensor, and the retard angle correction amount continuously set corresponding to this.

Furthermore, the construction may be such that instead of directly detecting the fluctuations in combustion pressure using a combustion pressure sensor, these are detected from fluctuations in engine rotational speed, and the retard angle correction amount is set by detecting the heavy/light grade of the fuel based on the rotational speed fluctuations.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. A method of controlling an ignition timing of an internal combustion engine, including the steps of:

detecting a property of a fuel supplied to the internal combustion engine incorporating an exhaust gas purification catalytic converter in an exhaust passage and generating a corresponding first signal;

determining a retard angle setting amount corresponding to the first signal;

controlling an ignition device to set an ignition timing retard angle of the engine, during a predetermined interval after engine start-up, using a retard angle correction amount selected in correspondence with the determined retard angle setting amount;

adjusting the retard angle correction amount to a progressively smaller value the heavier the detected property of the fuel, and to a progressively larger value the lighter the detected property of the fuel, and setting the retard angle correction amount to a level at which there is an increase in hydrocarbon amount generation in the exhaust gas; to thereby accelerate catalytic converter activity.

2. The method according to claim 1, wherein:

the detecting of the property of fuel is based on surge torque at steady operating conditions.

3. The method according to claim 1, wherein:

said fuel property detection is carried out by a sensor installed in a fuel line of the engine.

4. Apparatus for controlling an ignition timing of an internal combustion engine provided with an exhaust gas purifying catalytic converter, comprising:

means for detecting a selected property of a fuel supplied to the engine and for generating a corresponding first signal;

means for determining a retard angle setting amount for the engine in correspondence with the first signal;

means for controlling an ignition device to set an ignition timing retard angle of the engine, during a predetermined interval after engine start-up, using a retard angle correction amount selected in correspondence with the determined retard angle setting correction amount;

means for adjusting the retard angle correction amount to a progressively smaller value the heavier the detected property of the fuel and to a progressively larger value the lighter the detected property of the fuel; and means for setting the retard angle correction amount to a level at which there is an increase in hydrocarbon amount in the exhaust gas to obtain an increase in catalytic converter activity.

5. The apparatus according to claim 4, wherein:

the detecting means detects the selected property of the fuel based on surge torque at steady operating conditions.

6. The apparatus according to claim 4, wherein:

the detecting means is a sensor installed in a fuel line of the engine.

* * * * *